(12) United States Patent
Coon et al.

(10) Patent No.: US 7,814,288 B2
(45) Date of Patent: Oct. 12, 2010

(54) PROTECTING MEMORY OPERATIONS INVOLVING ZERO BYTE ALLOCATIONS

(75) Inventors: Thomas S. Coon, Kirkland, WA (US); Michael R. Marcelais, Renton, WA (US); Christopher C. White, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 540 days.

(21) Appl. No.: 11/731,262

(22) Filed: Mar. 29, 2007

(65) Prior Publication Data

US 2008/0244335 A1    Oct. 2, 2008

(51) Int. Cl.
*G06F 12/00* (2006.01)
*G06F 13/00* (2006.01)
*G06F 13/28* (2006.01)
*G06F 11/00* (2006.01)

(52) U.S. Cl. ............... 711/163; 711/100; 711/111; 711/170; 714/100; 714/25; 714/37; 714/39; 714/48; 714/53

(58) Field of Classification Search ............... None
See application file for complete search history.

(56) References Cited

U.S. PATENT DOCUMENTS

| | | | |
|---|---|---|---|
| 6,363,467 B1 * | 3/2002 | Weeks | 711/170 |
| 2007/0136547 A1 * | 6/2007 | Swafford | 711/170 |
| 2008/0162849 A1 * | 7/2008 | Savagaonkar et al. | 711/163 |

* cited by examiner

*Primary Examiner*—Stephen C Elmore
*Assistant Examiner*—Marwan Ayash
(74) *Attorney, Agent, or Firm*—Merchant & Gould, P.C.

(57) ABSTRACT

Applications are protected from being exposed to exploits and instabilities due to memory operations involving zero byte allocations. Memory operations involving a zero byte allocation are handled by a zero byte memory manager. When an application requests a zero byte allocation, a pointer to a protected part of memory is returned such that when the application attempts to read and/or write to the location the program flow is interrupted.

20 Claims, 3 Drawing Sheets

PROTECTING MEMORY OPERATIONS INVOLVING ZERO BYTE ALLOCATIONS

BACKGROUND

Software applications commonly request memory to be allocated for various uses such as storing variables, code and data. A memory allocation request may be a request for as little as zero bytes of memory. In response to the allocation request, the program receives a valid pointer to the memory location when memory is available that meets the request. This is true even when the request is for a zero byte allocation. If a program reads a value from one of these zero byte locations and attempts to use it, however, unintended results may occur. These unintended results may occur because the program changes program execution based on an unknown value that is contained within that location of memory. Additionally, if a program writes to one of these memory locations, the heap may become corrupted. This in turn can cause difficult stability problems which are difficult to diagnose, and can potentially lead to exploitable conditions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Applications are protected from being exposed to exploits and instability due to memory operations involving zero byte allocations. Memory operations involving a zero byte allocation are handled by a zero byte memory manager. When an application requests a zero byte allocation, a pointer to a protected part of memory is returned such that when the application attempts to read and/or write to the location the program flow is interrupted.

DETAILED DESCRIPTION

Figure 1:
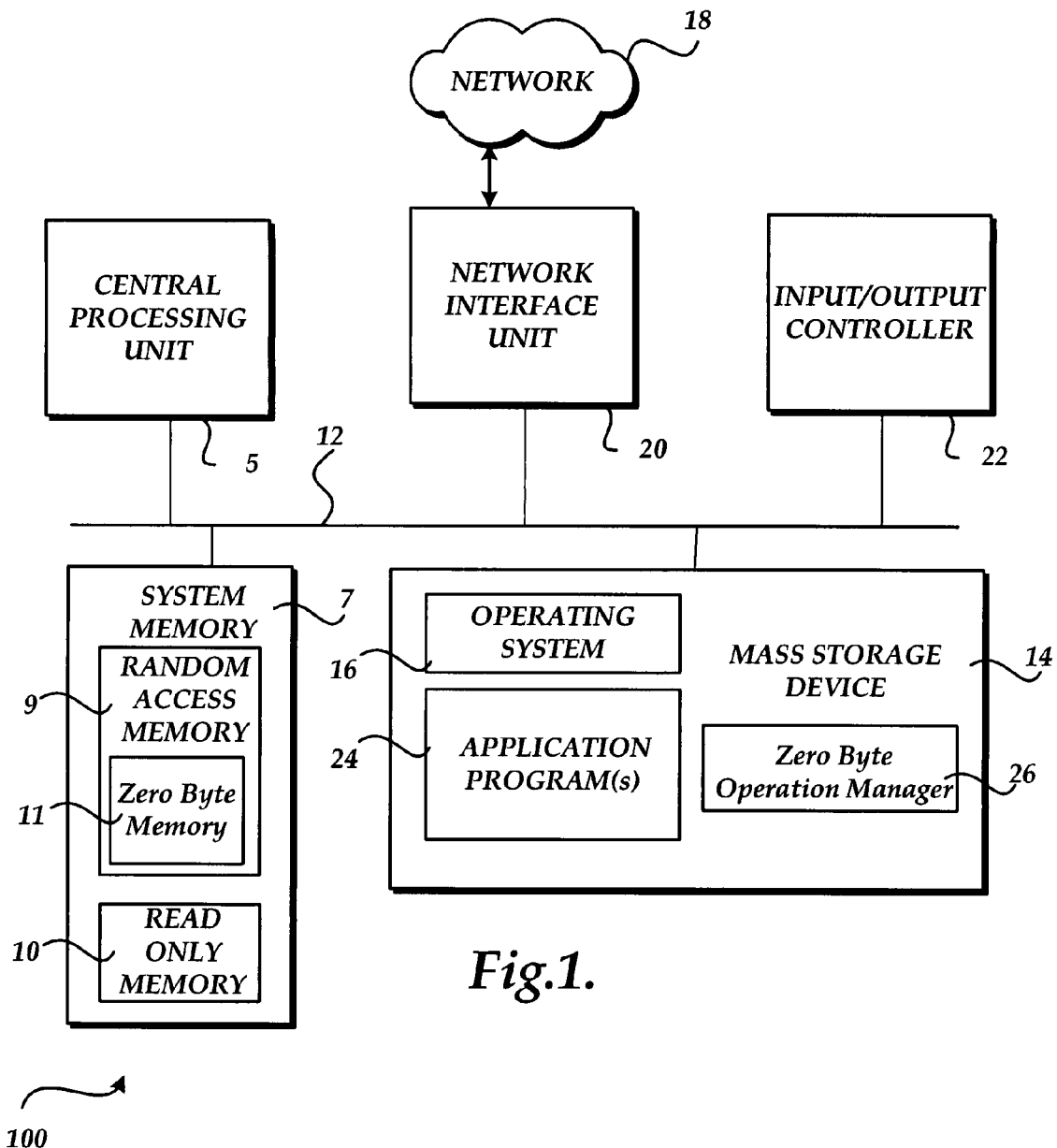
FIG. 1 illustrates an exemplary computing device.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") including a zero byte memory 11 and a read-only memory ("ROM") 10, and a system bus 12 that couples the memory to the CPU 5. While zero byte memory 11 is illustrated within RAM 9, zero byte memory 11 may be located within another type of memory. For example, zero byte memory 11 may be within a flash memory, cache memory, and the like. Generally, zero byte memory 11 is a section of memory that is protected from read and write access such that an attempt to read and/or write to one of the locations within the zero byte memory causes a fault to be generated such that program flow for an application is interrupted.

A basic input/output system containing the basic routines that help to transfer information between elements within the computer, such as during startup, is stored in the ROM 10. The computer 100 further includes a mass storage device 14 for storing an operating system 16, application programs 24, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS VISTA operating system from MICROSOFT CORPORATION of Redmond, Wash. The mass storage device 14 and RAM 9 may also store one or more program modules. In particular, the mass storage device 14 and the RAM 9 may store one or more application programs 24. The zero byte operation manager 26 is operative to protect applications from being exposed to exploits and instabilities due to erroneous zero byte allocations and any corresponding memory access attempts to these zero byte locations. For example the MICROSOFT OFFICE suite of application programs from MICROSOFT CORPORATION may be protected by zero byte operation manager 26. Other application programs may also utilize the zero byte operation manager 26.

Although zero byte operation manager 26 is shown separately from application program 24, it may be included directly within application program 24 or at some other location. For example, the zero byte operation manager 26 may be included directly within a program, the operating system 16, and the like. The operation of zero byte operation manager 26 will be described in more detail below.

Figure 2:
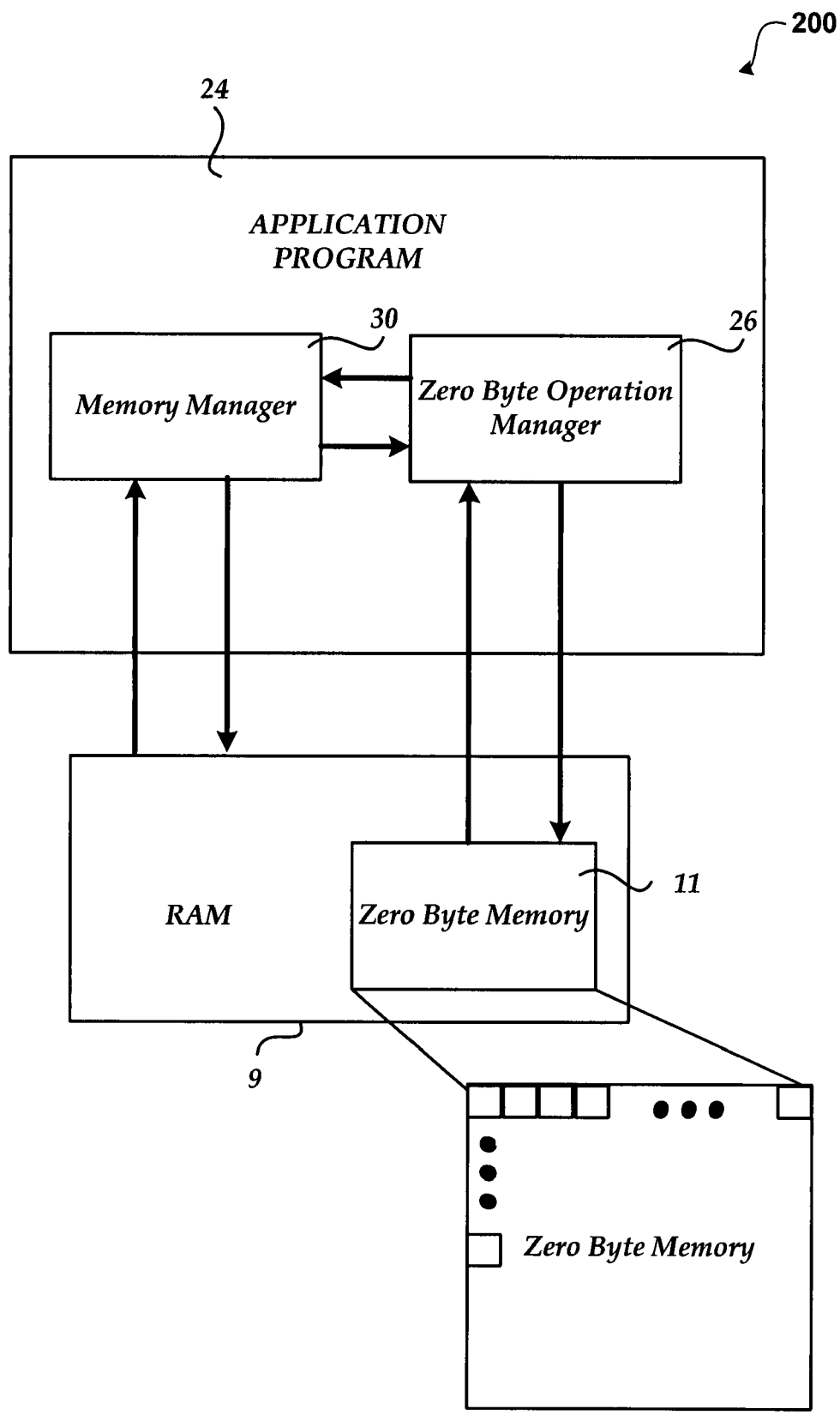
FIG. 2 shows a memory allocation system for protecting a program from memory operations involving zero byte allocations.

FIG. 2 shows a memory allocation system 200 for protecting a program from memory operations involving zero byte allocations. As illustrated, zero byte memory system 200 includes application program 24, zero byte operation manager 26, memory manager 30, RAM 9 and zero byte memory 11. Both the memory manager 30 and the zero byte operation manager 26 may be located differently within system 200. For example, memory manager 30 and zero byte operation manager 26 may be a part of the operating system.

As described briefly above, the zero byte operation manager 26 protects application program 24 from memory operations involving zero byte allocations. In system 200, application program 24 uses zero byte operation manager 26 for memory allocations and operations involving zero byte allocations and uses memory manager 30 for memory allocations and operations not involving zero byte allocations. When application program 24 requests a zero byte allocation, zero byte operation manager 26 returns a pointer to a zero byte allocation within zero byte memory 11. The zero byte allocation is obtained from zero byte memory 11 which is protected from access such that when application 24 attempts to read/write to one of the zero byte locations, the program flow of application 24 is interrupted. For example, an attempt to write to a zero byte allocation causes an exception to be generated which interrupts the execution of application 24. According to one embodiment, the zero byte memory 11 is configured as an array of one byte locations. Each of these one byte locations are protected, such as by marking zero byte memory 11 as "NO_ACCESS." When an exception does occur as a result of attempting to access one of these locations, the location of the fault is easier to locate as compared to when the memory for zero byte allocations is not protected. When application program 24 requests a allocation greater than zero bytes then memory manager 30 returns the pointer to the desired memory in RAM 9. Generally, any memory operation that involves a zero byte allocation is handled by zero byte operation manager 26 and any other memory operation is handled by memory manager 30 (See FIG. 3 and related description).

According to one embodiment, the zero byte memory 11 is initially reserved using memory manager 30 when application 24 is initiated. For example, the section of memory that is reserved may relate to pages of memory (i.e. 64 k) or some other size. Generally, the size of memory reserved is sufficient to handle all of the zero byte allocation requests. According to another embodiment, no specific section of memory is reserved. In this embodiment, each allocation specifically marks the allocated memory relating to the zero byte allocation as protected. The first pages of the zero byte memory 11 is used as a bitmap to track which bytes, or "buckets" within the later pages have been used, and use the beginning of those pages (the section that would correspond to the bitmap for those pages) to track additional metadata. Generally, the section of the zero byte memory 11 that actually contains the zero byte allocations is protected. If application 24 attempts to read or write from a location within zero byte memory 11, an access violation exception is returned.

Figure 3:
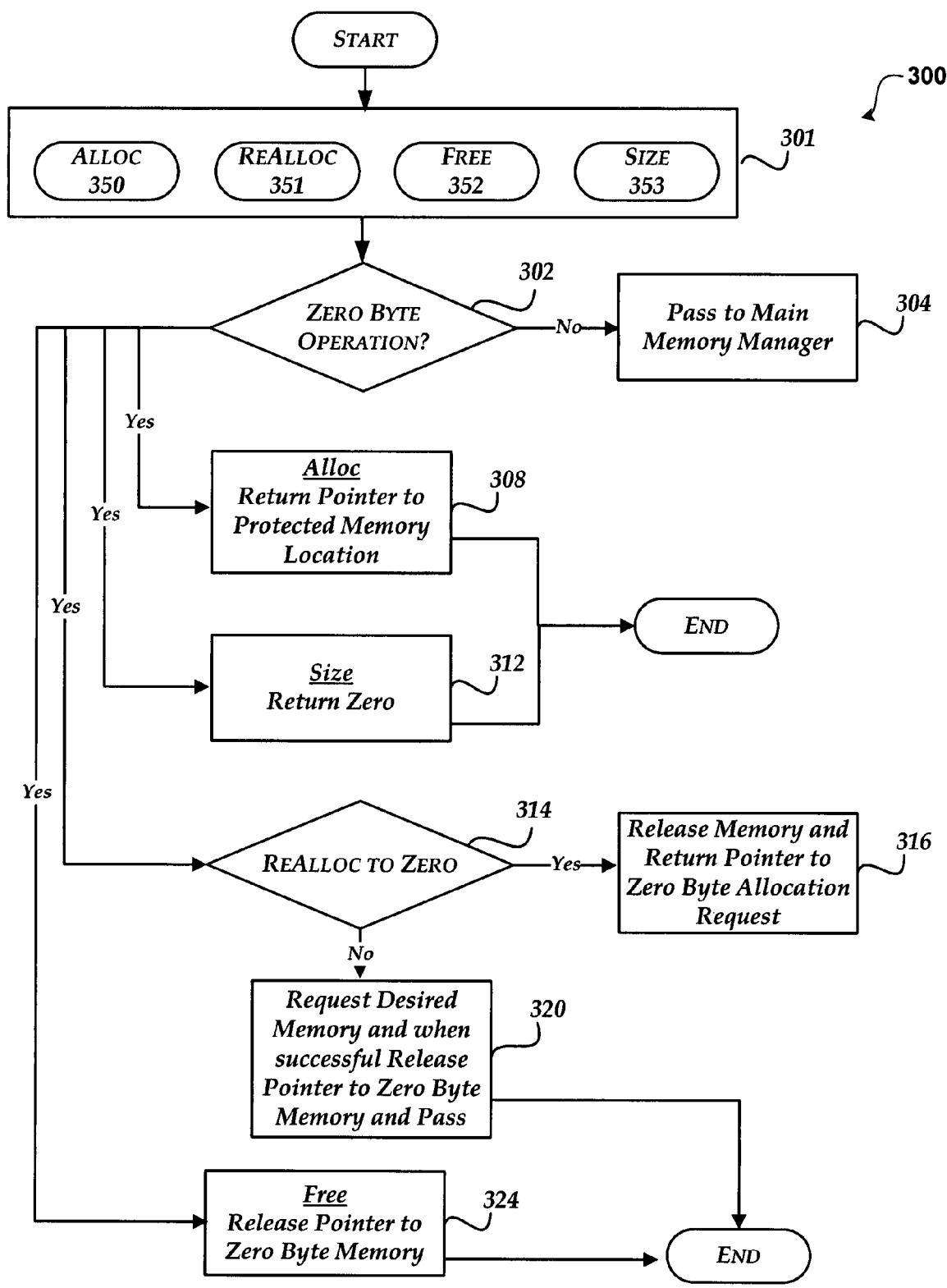
FIG. 3 shows an illustrative process for handling zero byte memory operations.

Referring now to FIG. 3, an illustrative process 300 for handling zero byte memory operations will be described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 301 where a call to a memory manager operation is received. According to one embodiment, the entry point to handling a memory operation involving a zero byte allocation is through the system's memory manager application program interfaces, such as through an Alloc 350 call; a ReAlloc 351 call; a Free 352 call and a Size 353 call.

Moving to operation 302, a determination is made as to whether the memory operation involves a zero byte memory operation. A zero byte memory operation is any memory operation involving a zero byte allocation.

When the memory operation is not a zero byte operation, the process flows to operation 304 where the memory operation is passed to the main memory manager. At this point, the main memory manager handles the request without involving the zero byte memory manager.

When the memory operation involves a zero byte operation, the process dispatches the memory operation to the appropriate handler to perform the operation involving the operation on the zero byte allocation.

When the operation is a zero byte allocation request, the process flows to operation 308 where a pointer to a protected location within the zero byte memory is returned to the application. According to one embodiment, the first free zero byte memory location is found within the zero byte memory by traversing a bitmap within the zero byte memory and determining when a zero byte location within the zero byte memory is free. For instance, a location may be determined to be free based on the value of the bit. According to one embodiment, the location is free when the bitmap is set to zero at that location. The bit is toggled once the location is used. Any determination of a free memory location, however, may be used.

When the memory operation is a size request of a zero byte location the process flows to operation 312 where a size of zero is returned.

When the memory operation is a reallocation request, the process flows to decision operation 314 where a determination is made as to whether the reallocation request is a reallocation request to size of zero.

When the memory operation is a request to reallocate to zero the process flows to operation 316 where the memory is released using the main memory manager and then a pointer to a location within the protected zero byte memory is returned as described above.

When the memory operation is not a reallocation request to zero, the process flows to operation 320 where an attempt to obtain the desired amount of memory using the main memory manager is performed. When the memory allocation request is successful, the zero byte memory location is released within the zero byte memory and the pointer to the acquired memory is returned. When the memory allocation request is not successful, the zero byte memory location is not released.

When the memory operation is a free request, the process flows to operation 324, where the pointer to the zero byte location is released. Upon freeing the pointer, the bit indicating that that bucket was used is toggled. According to one embodiment, the bit is "0" zero when free and "1" one when used. Other marking schemes may also be used.

After performing the memory operation, the process flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for handling memory operations involving a zero byte allocation, comprising:
    reserving an area of memory as a zero byte memory that is reserved for zero byte allocations, wherein all of the zero byte memory is protected such that an attempt to access any location within the zero byte memory by an application generates an exception, wherein the zero byte memory comprises a plurality of one byte locations;
    automatically determining when a memory operation for the application involves a zero byte allocation; wherein the zero byte allocation returns a pointer to a location within protected zero byte memory; and
    performing the memory operation independent of a main memory manager when the memory operation involves the zero byte allocation and performing the memory operation using the main memory manager when the memory operation does not involve the zero byte allocation, wherein memory allocated by the main memory manager is not located within the zero byte memory.

2. The method of claim 1, further comprising generating a notification to an application when an attempt is made to read from the zero byte memory location.

3. The method of claim 1, further comprising generating a notification to an application when an attempt is made to write to the zero byte memory location.

4. The method of claim 1, further comprising setting each location within the zero byte memory area to a no access protection such that a fault is generated when a read or write attempt is made to access the protected memory area.

5. The method of claim 4, further comprising returning a pointer to an unused memory position within the protected memory area when the memory operation is a zero byte allocation request.

6. The method of claim 4, further comprising releasing memory and returning a pointer to an unused memory position within the protected memory area when the operation is a reallocation to a zero byte allocation.

7. The method of claim 4, further comprising attempting to obtain requested memory and releasing the memory position within the protected memory area when the operation is a reallocation request from a zero byte allocation.

8. The method of claim 4, further comprising marking the location in the protected memory as unused when the memory operation is a free request.

9. A computer-readable storage medium having computer-executable instructions for handling memory operations involving a zero byte allocation, comprising:
    reserving an area of memory as protected memory, wherein the protected memory is reserved for zero byte allocations and wherein the protected memory is protected such that an attempt to access any location within the protected memory by an application generates an exception, wherein the zero byte memory comprises a plurality of locations;
    automatically determining when a memory operation involves a zero byte allocation;
    wherein the zero byte allocation points to a location in the protected memory reserved for zero byte allocations such that when the zero byte memory location is accessed within the protected memory an exception occurs and a program flow is interrupted; and
    performing the memory operation independent of a main memory manager when the memory operation involves the zero byte allocation and passing the memory operation to the main memory manager when the memory operation does not involve the zero byte allocation.

10. The computer-readable storage medium of claim 9, further comprising generating an access violation when an attempt is made to access the zero byte memory location.

11. The computer-readable storage medium of claim 9, further comprising reserving a section of memory from a main memory for the protected memory for the zero byte allocations when an application is launched.

12. The computer-readable storage medium of claim 9, further comprising returning a memory location within the protected memory when the memory operation is a zero byte allocation request.

13. The computer-readable storage medium of claim 9, further comprising releasing memory obtained by the main memory manager and returning a pointer to a memory position within the protected memory when the operation is a reallocation to a zero byte allocation.

14. The computer-readable storage medium of claim 9, further comprising attempting to obtain requested memory and releasing a memory position within the protected memory when the operation is a reallocation request from a zero byte allocation.

15. The computer-readable storage medium of claim 9, further comprising marking the location in the protected memory as unused when the memory operation is a free request.

16. A system for handling memory operations involving a zero byte allocation, comprising:
    a processor and a computer-readable medium;
    an operating environment stored on the computer-readable medium and executing on the processor;
    a memory manager that is configured to handle memory operations that involve an allocation greater than zero bytes;
    an application operating under the control of the operating environment and operative to make memory requests involving a zero byte allocation;
    a memory that includes a protected area such that when the protected area is accessed an exception is generated and program flow for the application is interrupted; and a zero byte operation manager that is configured to:
reserve the protected area, wherein the protected area is reserved for zero byte allocations;
automatically determine when a memory operation involves a zero byte allocation;
performing the memory operation using the zero byte operation manager only when the memory operation involves the zero byte allocation and passing the memory operation to the memory manager when the memory operation does not involve the zero byte allocation.

17. The system of claim 16, further comprising returning an access violation to the application when the application attempts to access the protected area of the memory.

18. The system of claim 16, further comprising returning a memory location within the protected area of the memory when the memory operation is a zero byte allocation request.

19. The system of claim 16, further comprising releasing memory obtained by the memory manager and returning a pointer to a memory position within the protected area of the memory when the operation is a reallocation to a zero byte allocation.

20. The system of claim 16, further comprising attempting to obtain requested memory using the memory manager and releasing a memory position within the protected area of the memory when the operation is a reallocation request from a zero byte allocation.

* * * * *